No. 684,144. Patented Oct. 8, 1901.
A. G. WATERHOUSE.
MOWING MACHINE.
(Application filed June 12, 1901.)
(No Model.)
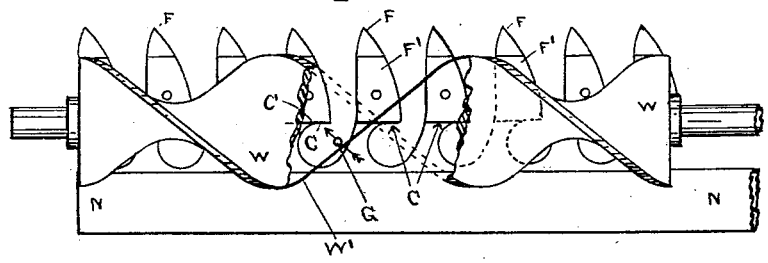
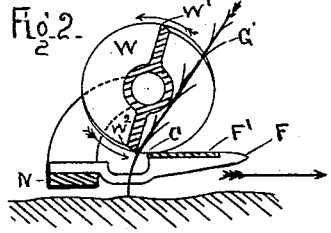
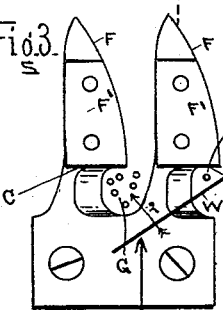
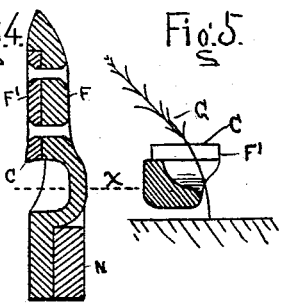
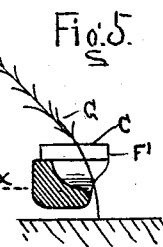
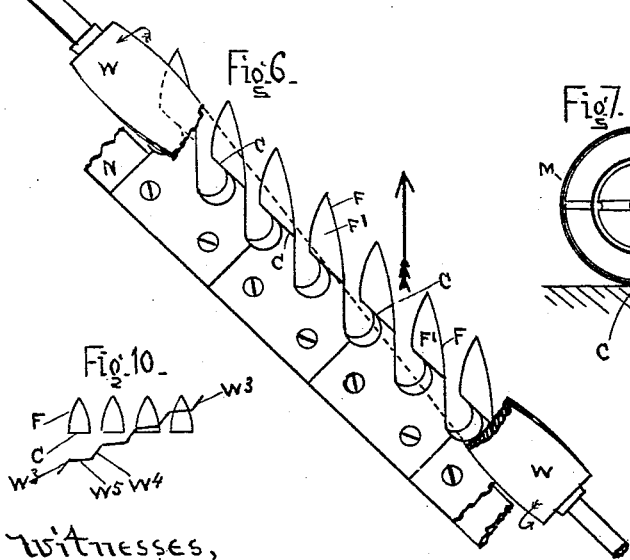
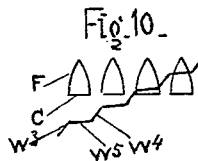
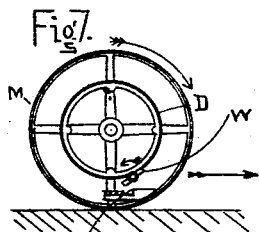
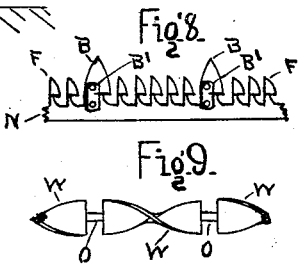
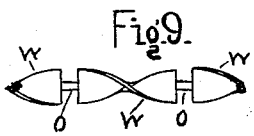
Witnesses,
W. S. Watson
Geo. L. G. Waterhouse
Inventor
Addison G. Waterhouse

UNITED STATES PATENT OFFICE.

ADDISON G. WATERHOUSE, OF SPRINGFIELD TOWNSHIP, DELAWARE COUNTY, PENNSYLVANIA.

MOWING-MACHINE.

SPECIFICATION forming part of Letters Patent No. 684,144, dated October 8, 1901.

Application filed June 12, 1901. Serial No. 64,207. (No model.)

*To all whom it may concern:*

Be it known that I, ADDISON G. WATERHOUSE, a citizen of the United States, residing in the township of Springfield, county of Delaware, and State of Pennsylvania, have invented new and useful Improvements in Mowing-Machines, of which the following is a specification.

My invention relates to the cutter-bar of a mowing-machine, and comprises rotary cutters journaled in brackets or bearings which are connected to the cutter-bar, having their axis of rotation at a right or oblique angle to the direction in which the mowing-machine advances and their direction of rotation opposite to that of the wheels of the mowing-machine, with stationary fingers attached to the cutter-bar and placed under the rotating cutters and having shearing edges upon and crossing their upper surfaces, said shearing edges facing backward from the points of the fingers and in a line parallel to and in shearing contact with the blades of the rotating cutters, the shearing-blades of the rotating cutters being formed spiral or otherwise to their axis of rotation, so that they will press the grass or grain to one side as it enters between the stationary fingers and back of their shearing edges, where it will be sheared off by the blades of the rotating cutters.

The operation of my invention is as follows: As the mowing-machine advances the fingers of the cutting-bar pass through the grass or grain to be mowed, and as the stalks of the grass get between two of the fingers the revolving cutter presses them to one side and brings them behind the shearing edges of the stationary plates, where they are sheared off between the shearing edges and the blade of the revolving cutter.

In order to more perfectly describe my invention, reference will be had to the accompanying drawings, made a part of this specification, in which—

Figure 1 shows a part of a cutter-bar with fingers, shearing-plates, and revolving cutter embodying my invention. Fig. 2 is a sectional end view of Fig. 1. Fig. 3 is a plan of Fig. 2. Fig. 4 is a section on line Y of Fig. 3. Fig. 5 is a cross-section on line X of Fig. 4. Fig. 6 is a modified form of cutting apparatus. Fig. 7 shows a mower-wheel geared to a cutter. Figs. 8, 9, and 10 are details.

Fig. 1 shows part of a cutter-bar N, having a number of fingers F. A shearing-plate F' is fixed to the upper surface of each finger, having a shearing edge C. This edge faces opposite to the direction in which the fingers F point and toward which the machine is moved. Each finger F is narrowed or partly cut away behind the shearing edge C, so that an open space is created into which the grass or grain passes and bringing it directly behind the cutting edges C. In the meantime the spiral blades of the revolving cutter W, which rotates in a direction which brings its lower blade toward the shearing edges C, presses the grass to one side in a way which brings it directly behind the shearing edges C, where it is sheared off as the blade of the cutter W passes the shearing edges C. In order to secure this shearing effect, the shearing edges C of each of the plates F' are placed exactly parallel to the axis of the revolving cutter W, thereby making it so that all the shearing edges C can be ground or sharpened in a straight line; otherwise curved shearing edges would be required, which for obvious reasons would be impractical. The spiral blades of the cutter W have the effect of bending the grass to one side or behind the shearing edges C, so that it will be cut off as the blades of the cutter pass these shearing edges.

To illustrate the foregoing: Assume that the small circle G represents an upright stalk of grass past which two of the fingers F have advanced, so that G is the rear of the line of the shearing edges C. Then assume that the heavy line W' represents the angle of the lower blade of the rotating cutter W. This line W' would move in the direction in which the fingers F point and in which the machine was moved; but the line W' would advance twice or three times as fast as the machine. This more rapid advance of line W' would cause it to strike the stalk G and throw it forward at an angle represented by the small arrow passing through G. This would throw G directly behind the shearing edge C, so that G would be sheared off as the line W', representing a blade of the cutter W, passed the shearing edge C.

Fig. 2 shows a section of a cutter-bar N and the revolving cutter W, with its cutting-blades W' and W². It also shows a finger F and a shearing-plate F' in section. This machine is assumed to be advancing in the direction of the arrow, and the cutter W rotates so that its upper blade W' will move backward and give the grass, as represented by the stalk G, a free chance to enter between the fingers F, where it is sheared off between the blade W² and the shearing edge C. As the stalk G falls upon the cutter W it is thrown backward by the backward motion of the upper blade of W, so that the machine will be free from the falling grass, and owing to this fact the diameter of W can be made very small, and as its speed of rotation can be comparatively slow therefore the power required for driving the machine will be light.

Fig. 3 shows a plan of two fingers F, made of one piece, with shearing-plates F' on their upper surfaces. These fingers may be made single or in groups of two or more and be secured to the cutter-bar. They may be made of soft metal with hardened shearing-plates, or all may be made of one kind of metal.

Fig. 4 shows a section of Fig. 3 drawn at the dotted line Y on Fig. 3, with a section of the cutter-bar N, to which the fingers are attached.

Fig. 5 shows a section of Fig. 4 at dotted line X. It also shows a stalk of grass G, bent to one side and in the rear of the shearing edge C of the plate F', as represented in explaining the effect of the spiral-shaped blades belonging to the cutter W.

Fig. 6 shows a modified form of my invention, in which the cutting-bar (represented by N) is at an oblique angle to the direction in which the machine is moved, as indicated by arrow, and the way the fingers point. In this form the shearing edges C of the plates F' and also the axis of the revolving cutters W (a part of which is shown in dotted line) are all at the same angle, so that a shearing effect is produced between the straight line formed by the shearing edges C and the blades of the cutter W, as described in connection with Fig. 1. In this form the blades of W need not be made spiral, as the angle at which W rotates will throw the grass behind the shearing edges C. A slight spiral is shown, so as to cause the shearing to occur at the different shearing-plates F' in succession, so as to cause a more even motion of the machine.

Fig. 7 shows a wheel M of a mowing-machine advancing, as indicated by arrow, and geared by a toothed wheel D, so that the rotation of the cutter W will be as indicated by the curved arrow, or so its lower blade will move toward the shearing edge C or in the direction in which the machine advances, while the upper blade will move in the opposite direction, so as to throw the grass backward.

Fig. 8 shows a section of a cutter-bar N, provided with groups of small fingers F, with large bearing-fingers B placed at intervals between them and having bearings B' placed on them, so the grass will be parted by the large bearing-fingers B.

Fig. 9 shows how two or more short cutters W can be placed on a shaft O and be laid in the bearings B' of Fig. 8 that will enable the cutter-bar N to be made of any length, while the cutters W can be made short in order to increase their lateral strength and make it practical to have them of comparatively small diameter.

Fig. 10 shows a zigzag line W³, which represents a form of cutting edge belonging to the blades of the revolving cutter W, as shown in Fig. 2. This zigzag form is arranged so that the cutting edges of W will be divided into two angles W⁴ and W⁵, the greater angles W⁴ being located so that they will revolve over the spaces between the fingers F and push the grass to one side and behind the shearing edges C, while the lesser angles W⁵ will rotate over and in shearing contact with the edges C and shear the grass off.

What I claim as my invention is—

1. In a mowing-machine a cutter-bar, provided with fingers having shearing edges facing backward from the finger-points; a cutter rotating on an axis parallel to the line formed by the shearing edges on the fingers, and in a direction to cause its lower surface to move toward the points of the fingers, and within shearing contact with the shearing edges on the fingers: substantially as and for the purposes set forth.

2. In a mowing-machine: a cutter-bar in combination with a rotating cutter placed above the cutter-bar, with fingers placed under the rotating cutter, having backward-facing shearing edges located on their upper surface and crossing fingers at or near their middle; the rotating cutter being provided with cutting-blades, which, when at the lower side of the cutter will extend at an angle from the direction in which the fingers point: substantially as and for the purposes set forth.

3. In a mowing-machine: the combination of a rotating cutter, means for causing it to revolve in a direction opposite to the rotation of the mower-wheels, said cutter provided with one or more cutting-blades extending along their axis of rotation; so that the part of their cutting edge while underneath will extend on a line forming an angle from the line on which the machine advances: and a cutter-bar having fingers extending from the bar in the direction in which the machine moves, said fingers being provided with shearing edges extending across their upper surfaces, near midway in their length and facing backward so that the rotating blades will come in shearing contact with the shearing edges on the fingers: substantially as described.

4. In a mowing-machine: the combination of a rotating cutter, geared so as to revolve in a direction opposite to the revolution of the mower-wheels, and a cutter-bar, having fingers provided with shearing edges, facing opposite to the points of the fingers, and placed in shearing contact with the blades of the rotating cutter: substantially as described.

5. In a mowing-machine: a cutting-bar, having fingers provided with shearing edges facing backward, and crossing their upper surfaces at an angle which will bring the shearing edges of all the fingers in a straight line, and an open space between the fingers and back of their shearing edges; and a rotating cutter having its axis of rotation above and parallel to the shearing edges on the fingers and its cutting-blades at an angle to the line formed by the cutting edges on the fingers while in shearing contact with the same; substantially as set forth.

ADDISON G. WATERHOUSE.

Witnesses:
W. S. WATSON,
GEO. L. G. WATERHOUSE.